(12) United States Patent
Martin

(10) Patent No.: US 12,221,043 B2
(45) Date of Patent: *Feb. 11, 2025

(54) SYSTEMS AND METHODS FOR DISTRIBUTION OF POWER IN A MARINE VESSEL, ATVS, AND VEHICLES

(71) Applicant: Sea Clear Power Inc., Cherokee, AL (US)

(72) Inventor: Nathan Martin, Sheffield, AL (US)

(73) Assignee: Sea Clear Power Inc., Cherokee, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,981

(22) Filed: Feb. 13, 2023

(65) Prior Publication Data

US 2023/0192019 A1 Jun. 22, 2023

Related U.S. Application Data

(63) Continuation of application No. 17/740,312, filed on May 9, 2022, now Pat. No. 11,577,675, which is a
(Continued)

(51) Int. Cl.
  *B60R 16/033* (2006.01)
  *B60R 16/02* (2006.01)
  (Continued)

(52) U.S. Cl.
  CPC ........ *B60R 16/033* (2013.01); *B60R 16/0215* (2013.01); *H01R 13/68* (2013.01);
  (Continued)

(58) Field of Classification Search
  None
  See application file for complete search history.

(56) References Cited

U.S. PATENT DOCUMENTS

| | | | |
|---|---|---|---|
| 4,081,738 A * | 3/1978 | Roller | B63H 23/24 320/DIG. 34 |
| 4,280,748 A | 7/1981 | McHenney | H01R 13/68 439/620.26 |

(Continued)

FOREIGN PATENT DOCUMENTS

| | | | |
|---|---|---|---|
| CA | 2826932 A1 | 3/2014 | H02J 3/00 |
| CA | 3164020 A1 * | 4/2022 | B60R 16/023 |

(Continued)

OTHER PUBLICATIONS

Email.Vance. "Proposed Claims for Examiner's Amendment" (Year: 2022).

*Primary Examiner* — Binh B Tran
*Assistant Examiner* — Muhammed Azam
(74) *Attorney, Agent, or Firm* — Dentons US LLP

(57) ABSTRACT

A system for power distribution including a first connection and a second connection each connected respectively to be a first multi connector cable and a second multi connector cable; said second multi connector cable being split into a set of two distinct wires with each distinct wire including a circuit protector, wherein each of the first multi connector cable and the second multi connector cable are ultimately connected respectively to a third connection and a fourth connection, and a fifth connection and a sixth connection.

17 Claims, 3 Drawing Sheets

Related U.S. Application Data continuation of application No. 17/080,285, filed on Oct. 26, 2020, now Pat. No. 11,491,935.

(60) Provisional application No. 62/926,039, filed on Oct. 25, 2019.

(51) Int. Cl.
 *H01R 13/68* (2011.01)
 *H02J 4/00* (2006.01)

(52) U.S. Cl.
 CPC ............ *H02J 4/00* (2013.01); *H01R 2201/26* (2013.01); *H02J 2310/42* (2020.01)

(56) References Cited

U.S. PATENT DOCUMENTS

| | | | | |
|---|---|---|---|---|
| 4,846,697 A | 7/1989 | Rodgers | ............... | B60D 1/62 439/35 |
| 5,209,670 A | 5/1993 | Meurer | ............... | H01R 13/68 439/654 |
| 5,237,208 A * | 8/1993 | Tominaga | ............... | G05F 1/59 307/66 |
| 5,301,096 A | 4/1994 | Klontz | ............... | H02J 50/40 320/108 |
| 5,324,214 A | 6/1994 | De Castro | ............... | B60R 16/02 439/655 |
| 5,501,605 A * | 3/1996 | Ozaki | ............... | B60R 16/0207 439/724 |
| 5,532,525 A * | 7/1996 | Kaiser | ............... | H02J 9/062 307/64 |
| 5,581,130 A * | 12/1996 | Boucheron | ............... | H05K 7/026 361/752 |
| 5,703,411 A | 12/1997 | Bella | ............... | B60R 16/0207 340/472 |
| 5,963,013 A * | 10/1999 | Watson | ............... | H02J 7/342 324/426 |
| 6,218,740 B1 * | 4/2001 | Mildice | ............... | H01R 31/005 307/42 |
| 6,429,544 B1 * | 8/2002 | Sasaki | ............... | B60N 2/02246 307/10.1 |
| 6,738,692 B2 * | 5/2004 | Schienbein | ............... | H02M 7/003 700/286 |
| 7,719,130 B2 * | 5/2010 | Hirose | ............... | H02J 4/00 174/75 C |
| 7,999,180 B2 * | 8/2011 | Lindsey | ............... | B60R 16/0215 174/50.5 |
| 8,049,358 B2 * | 11/2011 | Crane | ............... | B63H 23/24 307/9.1 |
| 8,111,502 B2 * | 2/2012 | Rocke | ............... | E21B 33/0355 361/603 |
| 8,172,603 B1 * | 5/2012 | Richardet, Jr. | ............... | H01R 11/24 439/759 |
| 8,982,578 B2 * | 3/2015 | Bryan | ............... | B60Q 11/005 361/784 |
| 9,004,961 B1 | 4/2015 | French | ............... | B63H 20/00 320/125 |
| 9,035,611 B2 * | 5/2015 | Kikuchi | ............... | B60L 58/18 320/116 |
| 9,444,263 B2 * | 9/2016 | García Sosa | ............... | G08B 21/182 |
| 9,559,473 B2 * | 1/2017 | Boudreaux | ............... | H01R 11/288 |
| 9,666,336 B2 * | 5/2017 | Husband | ............... | H01R 4/68 |
| 9,744,925 B2 * | 8/2017 | Dong | ............... | H02J 4/00 |
| 9,745,038 B2 * | 8/2017 | Lai | ............... | H02J 1/14 |
| 9,866,047 B2 * | 1/2018 | Boudreaux | ............... | H01M 50/51 |
| 9,887,561 B2 * | 2/2018 | Jouper | ............... | B64D 11/0624 |
| 9,945,909 B2 * | 4/2018 | Hadler-Jacobsen | ............... | H02J 3/26 |
| 9,960,612 B2 * | 5/2018 | Ono | ............... | B60L 55/00 |
| 10,005,535 B2 * | 6/2018 | Brennan | ............... | B63B 35/00 |
| 10,199,824 B2 * | 2/2019 | Janik | ............... | G01R 31/40 |
| 10,723,419 B1 | 7/2020 | Jordan | ............... | B63B 34/20 |
| 10,770,871 B2 * | 9/2020 | Trandal | ............... | H02J 4/00 |
| 10,850,628 B2 * | 12/2020 | Rauma | ............... | B63H 21/17 |
| 11,121,557 B2 * | 9/2021 | Cottrell | ............... | B64D 31/14 |
| 11,491,935 B2 * | 11/2022 | Martin | ............... | B60R 16/0215 |
| 2002/0123267 A1 | 9/2002 | Brooks | ............... | H01R 13/68 439/620.33 |
| 2003/0091960 A1 | 5/2003 | Rosa | ............... | F41J 7/04 434/21 |
| 2003/0207619 A1 | 11/2003 | Beideman | ............... | H01R 13/68 439/620.3 |
| 2004/0145340 A1 | 7/2004 | Horenstein | ............... | H01R 24/84 320/105 |
| 2005/0070155 A1 | 3/2005 | Horenstein | ............... | H01R 24/84 439/522 |
| 2006/0003627 A1 | 1/2006 | Freitag | ............... | H01R 13/68 439/504 |
| 2006/0044722 A1 | 3/2006 | Wavering | ............... | F02C 7/36 361/62 |
| 2008/0014800 A1 * | 1/2008 | Homyk | ............... | H01R 31/06 439/638 |
| 2008/0025058 A1 | 1/2008 | Gerber | ............... | H02J 3/44 361/85 |
| 2008/0117568 A1 | 5/2008 | Reed | ............... | H01H 85/306 439/620.26 |
| 2008/0123376 A1 | 5/2008 | Ho | ............... | H01R 31/06 363/74 |
| 2008/0233785 A1 * | 9/2008 | Yaworski | ............... | H01H 85/0021 439/405 |
| 2008/0261459 A1 | 10/2008 | Choi | ............... | H01R 9/2466 439/709 |
| 2008/0318467 A1 * | 12/2008 | Denomme | ............... | H01R 31/08 439/511 |
| 2010/0033130 A1 | 2/2010 | Mizushima | ............... | B63H 23/24 320/126 |
| 2012/0091913 A1 | 4/2012 | Arntson | ............... | G05B 19/0423 307/31 |
| 2014/0209345 A1 | 7/2014 | Minadeo | ............... | H01R 4/72 174/84 R |
| 2015/0036256 A1 * | 2/2015 | Baker | ............... | H02J 4/00 361/191 |
| 2016/0023740 A1 | 1/2016 | Skrzypchak | ............... | B63H 21/21 439/34 |
| 2016/0229362 A1 * | 8/2016 | Brutus | ............... | B60R 16/033 |
| 2016/0231370 A1 | 8/2016 | Fasnacht | ............... | H01B 7/0045 |
| 2016/0288887 A1 | 10/2016 | Corley | ............... | B63J 3/00 |
| 2017/0317492 A1 | 11/2017 | Koebler | ............... | H01M 4/5805 |
| 2017/0346140 A1 * | 11/2017 | Koebler | ............... | H01M 4/5825 |
| 2018/0069412 A1 | 3/2018 | Corley | ............... | B63B 45/06 |
| 2018/0215277 A1 | 8/2018 | Deguchi | ............... | H02J 50/50 |
| 2018/0337496 A1 | 11/2018 | McRae | ............... | H01R 24/30 |
| 2018/0370466 A1 * | 12/2018 | Murata | ............... | E05F 15/695 |
| 2019/0164663 A1 | 5/2019 | Alfson | ............... | H01B 13/0036 |
| 2019/0199044 A1 | 6/2019 | Bloom | ............... | H01R 24/20 |
| 2019/0263495 A1 | 8/2019 | Corley | ............... | H01R 33/94 |
| 2019/0312439 A1 | 10/2019 | Cottrell | ............... | H02J 3/46 |
| 2020/0040705 A1 | 2/2020 | Morris | ............... | H02J 3/00 |
| 2021/0122313 A1 | 4/2021 | Martin | ............... | B60R 16/033 |

FOREIGN PATENT DOCUMENTS

| | | | |
|---|---|---|---|
| CN | 201044532 Y | 4/2008 | |
| CN | 204003109 U | 12/2014 | |
| CN | 104712849 A | 6/2015 | ......... B60R 16/0215 |
| CN | 206485298 U | 9/2017 | ........... B60R 16/033 |
| CN | 107380094 A | 11/2017 | |
| CN | 108944488 A | 12/2018 | ......... B60L 11/1818 |
| CN | 109075618 A | 12/2018 | ............... H01Q 3/08 |
| CN | 110323643 A | 10/2019 | |
| CN | 111137141 A | 5/2020 | ......... B60L 11/1816 |
| DE | 3529660 C2 | 8/1985 | |
| DE | 4028987 A1 | 9/1990 | |
| DE | 102005004628 A1 | 8/2006 | ............... B63J 3/04 |
| DE | 10261264 B4 | 7/2007 | ............... H01R 11/01 |
| DE | 102006053477 A1 | 5/2008 | ............... B60D 1/64 |
| DE | 202009003713 U1 | 7/2009 | ......... B60R 16/0207 |
| DE | 102009009934 A1 | 10/2009 | ......... H01H 85/0417 |
| DE | 102012001320 A1 | 7/2013 | ......... B60R 16/0207 |
| DE | 102013201331 A1 | 7/2014 | ............... H01R 4/62 |
| DE | 112012006282 T5 | 1/2015 | ......... B60R 16/0215 |

(56) References Cited

FOREIGN PATENT DOCUMENTS

| | | | | |
|---|---|---|---|---|
| DE | 102016106883 A1 | 11/2016 | ............. | B60L 1/003 |
| DE | 102015110593 A1 | 1/2017 | ............. | B60R 16/02 |
| DE | 102016120988 A1 | 5/2018 | ......... | B60R 16/0207 |
| DE | 102017221845 A1 | 2/2019 | ............. | H01H 85/20 |
| DE | 102017131352 A1 | 6/2019 | ............. | H01R 4/186 |
| EP | 0009769 A1 * | 4/1980 | | |
| EP | 0543469 A1 | 9/1992 | | |
| EP | 2011960 A2 | 1/2009 | ......... | E21B 33/0355 |
| EP | 2595265 A1 | 5/2013 | ............. | B63H 23/24 |
| EP | 2621022 A1 | 7/2013 | ............. | H01R 11/12 |
| EP | 2720414 A1 | 4/2014 | ................ | H02J 4/00 |
| EP | 3203601 A1 * | 8/2017 | | |
| EP | 2457287 B1 | 1/2019 | ............. | H01R 4/34 |
| FR | 2936645 A1 | 4/2010 | ............. | H01B 7/428 |
| GB | 1599318 A | 9/1981 | ............. | H01R 13/68 |
| GB | 2291277 A | 1/1996 | ......... | B60R 16/0215 |
| GB | 2456179 A | 7/2009 | ................ | B60L 1/00 |
| GB | 2574039 A | 11/2019 | ............. | B60L 1/003 |
| IT | 1147044 B | 11/1986 | ........... | H01H 85/044 |
| JP | 06107087 A | 4/1994 | | |
| JP | H06107087 A * | 4/1994 | | |
| JP | 2004140981 A | 5/2004 | ............. | B60L 53/20 |
| KR | 20010102125 A | 11/2001 | | |
| KR | 101149930 B1 | 5/2012 | | |
| KR | 20120118671 A | 10/2012 | | |
| KR | 20180046056 A | 5/2018 | | |
| KR | 20180001743 U | 6/2018 | | |
| WO | WO-0224523 A2 | 3/2002 | ................ | B63H 21/17 |
| WO | WO-02078148 A1 | 10/2002 | ................ | B63J 3/04 |
| WO | WO-03058763 A2 | 7/2003 | ................ | B62J 99/00 |
| WO | WO-2009139220 A1 * | 11/2009 | ............. | H01B 7/285 |
| WO | WO-2010032287 A1 | 3/2010 | ............. | B60R 16/02 |
| WO | WO-2012034984 A2 | 3/2012 | ......... | E21B 33/0355 |
| WO | WO-2012164029 A2 | 12/2012 | ............. | E21B 33/035 |
| WO | WO-2013022476 A1 | 2/2013 | ............. | B63B 13/00 |
| WO | WO-2013039403 A1 | 3/2013 | ................ | H02J 4/00 |
| WO | WO-2015197140 A1 | 12/2015 | ......... | E21B 33/0355 |

\* cited by examiner

SYSTEMS AND METHODS FOR DISTRIBUTION OF POWER IN A MARINE VESSEL, ATVS, AND VEHICLES

INDEX TO RELATED APPLICATIONS

This application is a Continuation of U.S. patent application Ser. No. 17/740,312, filed on May 9, 2022, which is a Continuation of U.S. patent application Ser. No. 17/080,285, filed on Oct. 26, 2020 (now U.S. Pat. No. 11,491,935, issued on Nov. 8, 2022), which claims the benefit of U.S. Provisional Application No. 62/926,039, filed on Oct. 25, 2019, the contents of which are all hereby incorporated by reference herein in their entirety.

BACKGROUND OF THE INVENTION

It is a common difficulty that vessels in vehicles with a main power source are not configured for aftermarket power distribution from the native power source. Throughout the years many different Devices and techniques have been used for marine vessels, all-terrain vehicles, and even conventional motor vehicles. Most often, these devices and techniques require labor-intensive connections and installations and significant skill in the handling of electrical wiring and components. There is a great need for a simple power distribution system that does not require labor-intensive connections and significant skill in handling electronica wiring components.

The present invention addresses this issue.

SUMMARY OF THE INVENTION

The present invention provides a ready to use complete harness system allowing for distribution of power from a main power source. Although figures and examples here in refer to marine vessels, it is contemplated that the harness system of the present invention is suitable for a plurality of vehicles including conventional motor vehicles and all-terrain vehicles.

There are a very significant and large number of combinations relating to suitable wire cables and suitable fuse arrangements.

The present invention was not merely simple substitution and trial and error.

A significant amount of research was undertaken and completed in order to arrive at the specific combination providing 4 AWG wire and 20 amp fuses.

In one embodiment, the invention is a harness system for power distribution, said system comprising:
  a first closed end lug and second closed end lug each independently connected to a first multi connector cable and second multi connector cable respectively;
  Said second multi connector cable being split into two distinct wires with each connected to a blade fuse;
  Said two distinct wires connected each to a first opening of firsthand lock connector and first opening secondhand lock connector respectively;
  a second set of distinct cable wires each connected respectively to a second opening of firsthand lock connector and a second opening of secondhand lock connector respectively;
  wherein each of first multi connector cable and second multi connector cable are ultimately connected respectively to first terminating hand lock connector and second terminating hand lock connector third terminating hand lock connector and fourth terminating hand lock connector.

In one embodiment, the invention is configured such that each of said cable wires are 4 AWG.

In one embodiment, the invention is configured such that said blade fuses are 20 amp.

In one embodiment, the invention is configured such that of said first closed end lug and second closed end lug are attached to a primary vehicle battery source.

In one embodiment, the primary vehicle battery source is the battery source on a marine vessel.

In one embodiment, the invention is harness system for power distribution in a marine vessels, said system consisting of:
  a first closed end lug and second closed end lug each independently connected to a first multi connector cable and second multi connector cable respectively that are 4 AWG;
  said second multi connector cable being split into two distinct wires with each connected to a blade fuse 20 amp;
  said two distinct wires connected each to a first opening of firsthand lock connector and first opening secondhand lock connector respectively;
  a second set of distinct cable wires each connected respectively to a second opening of firsthand lock connector and a second opening of secondhand lock connector respectively;
  wherein each of first multi connector cable and second multi connector cable are ultimately connected respectively to first terminating hand lock connector and second terminating hand lock connector third terminating hand lock connector and fourth terminating hand lock connector, wherein each of said first closed end lug and second closed end lug are attached to a primary marine vessel battery source.

DETAILED DESCRIPTION OF THE PREFERRED EMBODIMENT

Figure 1:
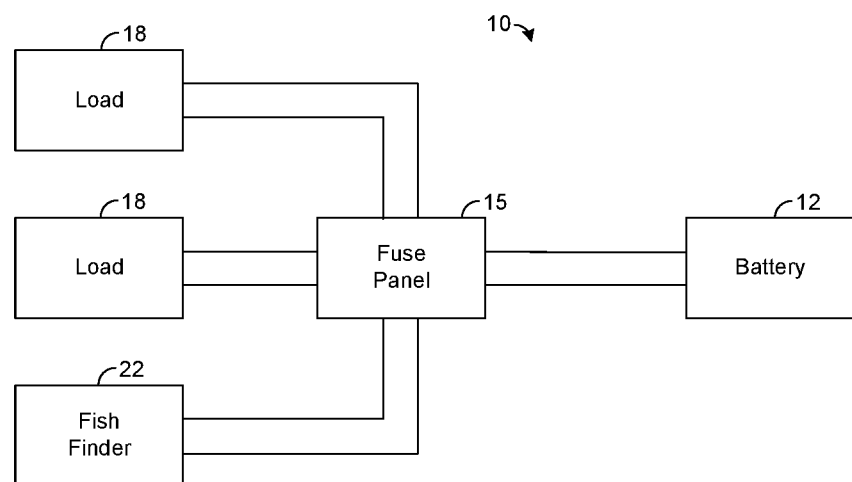
FIG. 1 is a schematic of conventional electrical distribution systems.

FIG. 1 shows a conventional electrical system 10 for a boat. The system has a battery 12 that is electrically coupled to a circuit protection 15 by a pair of wires for carrying a direct-current (DC) power signal to the circuit protection 15. The circuit protection 15 is electrically coupled to various loads 18, such as lights, pumps, motors, or other electrical equipment that may be used on the boat. The circuit protection 15 passes current of the power signal through a plurality of fuses for distribution of power to the loads 18. The circuit protection 15 is also electrically coupled to a conventional fish finder 22 that is configured to find fish and display the locations of the fish, as described above.

The loads 18 may draw power from the battery 12 through the circuit protection 15 in a sporadic manner causing fluctuations in the current and voltage of the power signal provided to the fish finder 22. These fluctuations at the input of the fish finder 22 are exacerbated by the fact that power delivered to the loads of the boat, including the fish finder 22, share the same electrical conduit, such as the same bus or cable connecting the circuit protection 15 to the battery 12. Further, over time, the voltage and/or current output by the battery 12 may decrease as the energy in the battery 12 is depleted. Moreover, the fluctuations in the power signal can adversely affect the performance of the fish finder 22. In some cases, the power delivered to the fish finder 22 can undesirably fall below the power specifications of the fish finder 22. As a result of the fluctuations, the image displayed by the fish finder 22 can become distorted making it more difficult for a user to identify or locate fish based on the image.

In addition, the distortions and performance problems of the fish finder 22 caused by the power fluctuations may be transient, depending on the current levels drawn by other loads 18 of the boat and the level of energy remaining in the battery 12, making it difficult determine the source of the problem or making performance of the fish finder 22 unpredictable.

Figure 2:
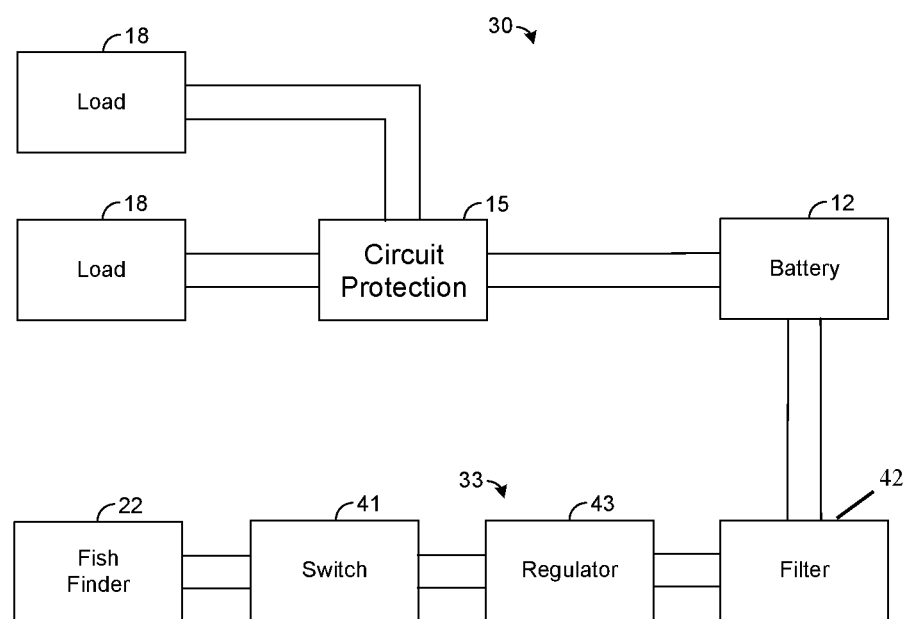
FIG. 2 is a schematic of an electrical distribution system of the present invention.

FIG. 2 depicts an exemplary electrical system 30 that powers a fish finder 22 through an electrical connection that bypasses the circuit protection 15. Although the figure demonstrates use with a fish finder, the invention is not limited in scope to this single component.

In the embodiment show by FIG. 2, the fish finder 22 is electrically coupled to the battery 12 through a separate cable system 33 that is not used for power the other loads 18. The cable system 33 of FIG. 2 comprises a switch 41, filter 42, and regulator 43 that are electrically and serially connected to each other by wires. As an example, each component of the cable system 33 may be connected to the next electrical component by a pair of wires (or other numbers of wires) that are bound within a cable. Thus, a power signal from the battery 12 passes through the cable system 33 for powering the fish finder 22 via an electrical path that bypasses the circuit protection 15. If desired, the cable system 33 may be electrically coupled to the same battery terminals as the circuit protection 15.

Since the fish finder 22 is connected to the battery 12 via an electrical path that bypasses the circuit protection 15, fluctuations in the power signal received by the fish finder 22 should be less pronounced. In addition, as will be described in more detail below, the cable system 33 includes components that help to reduce or mitigate the fluctuations so that a more stable power signal is provided to the fish finder 22.

In this regard, the filter 42 is configured to filter fluctuations in the power signal to provide an output that is smoother and more stable relative to the power signals distributed by the circuit protection 15 to the loads 18. Further, the regulator 43 is configured to regulate the voltage and current of the received power signal to provide an output that has substantially constant current and voltage. As an example, the regulator 43 may be implemented by a DC-to-DC converter that is configured to receive a DC signal and output a DC signal at a constant voltage and current. Notably, the DC-to-DC converter outputs a substantially constant voltage and current event when the input of the DC-to-DC converter fluctuates.

The switch 41 is configured to transition between an open circuit state and a short circuit state based on manual input by a user. During operation of the fish finder 22, the switch 41 may be controlled to be in the short circuit state, thereby providing a short circuit for current to pass. When operation of the fish finder 22 is no longer desired, the user may control the switch 41 to transition it to the open circuit state so that the fish finder 22 is electrically isolated from the battery 12. In the open circuit state, the switch 41 prevents the fish finder 41 from drawing current from the battery 12, thereby conserving the energy within the battery 12 for other uses. This may be desirable since the fish finder 22 may continue to draw a small amount of current even when turned off. If desired, the cable system 33 may include in-line fuses (not shown) to help prevent unusually high voltages or currents.

The filter 42 and regulator 43 help to suppress fluctuations in the power signal caused by the loads 18 and other factors so that a stable power signal having a relatively constant voltage and current is provided to the fish finder 22. In addition, the regulator 43 can be specifically designed to provide a constant output power that satisfies the power specifications of the fish finder 22. As a result, the fish finder 22 should receive a power signal that is more stable and consistent with its power requirements so that the operation and performance of the fish finder 22 is less affected by the loads 18. Specifically, since the cable system 33 eliminates or reduces fluctuations in the power signal delivered to the fish finder 22, the image displayed by the fish finder 22 should be less distorted relative to the embodiment shown by FIG. 1.

If desired, existing boats having the electrical system 10 shown by FIG. 1 can be easily retrofitted to provide the system 30 shown by FIG. 2. In this regard, the fish finder 22 of FIG. 1 may be disconnected from the circuit protection 15 and connected to the battery 12 using the cable system 33, as shown by FIG. 2. Addressing the performance issues of the fish finder 22 in this manner may be considerably less expensive than other possible solutions.

As an example, it is possible to alleviate the performance issues of the fish finder 22 of FIG. 1 by adding more batteries 12 to provide more power through the circuit protection 15. However, the cost of adding more batteries or upgrading the battery 12 to provide more power is likely much greater than the cost of the components of the cable system 33.

Figure 3:
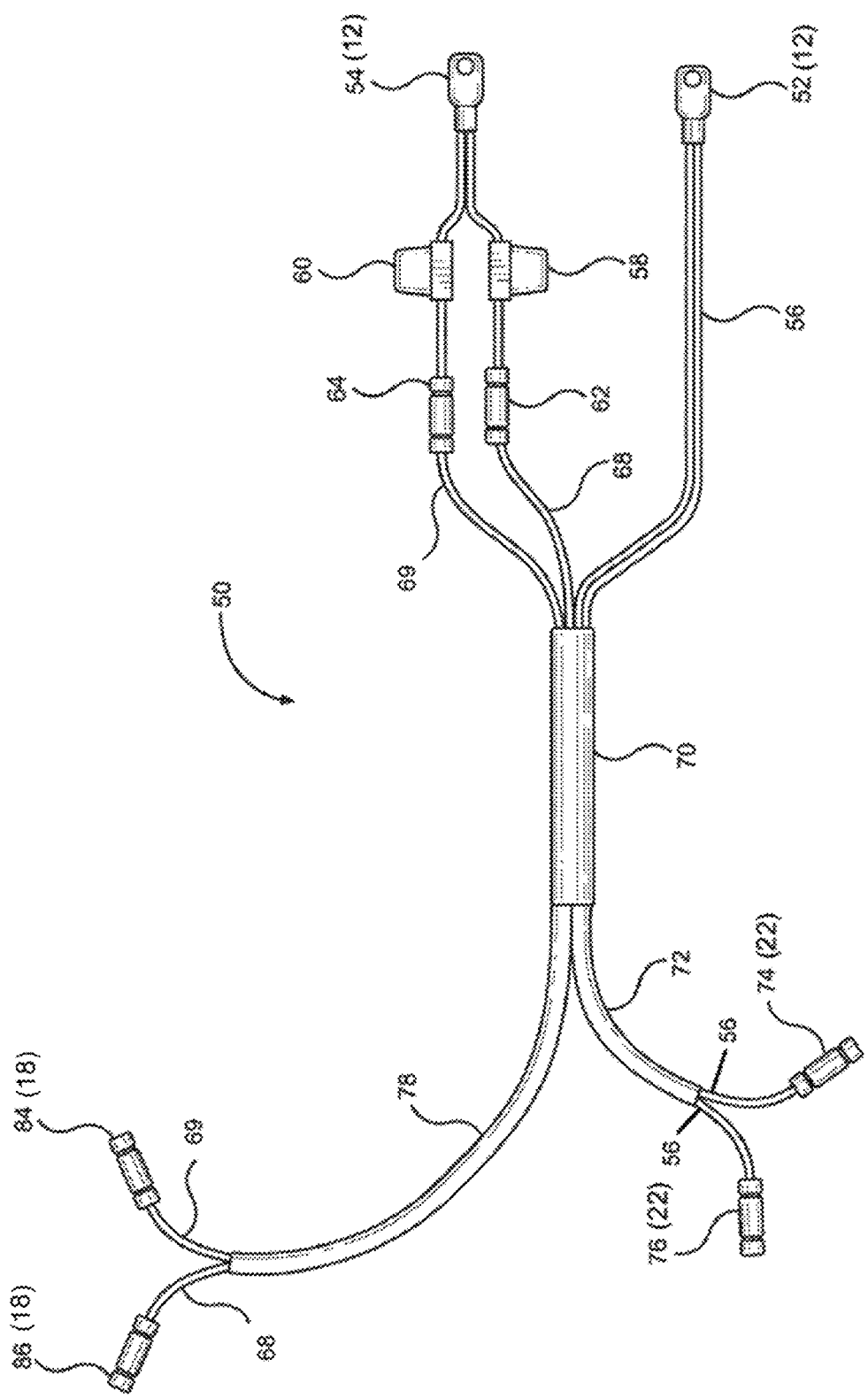
FIG. 3 is a plan view of the system of the present invention.

As generally understood and demonstrated in FIG. 3, system 50 of the present invention has a first closed end lug 52 and a second closed and lug 54 constructed and arranged for connection to a primary electrical source. In a marine vessel, all-terrain vehicle, or conventional motor vehicle this would be the main battery. In one preferred embodiment, these lugs are provided as connected to wire in a standard for the diameter (gauge) of round drawn wire, being the American Wire Gauge (AWG) as 4 AWG. The size is commonly known as the smallest AWG size is 40 and the largest is 0000. A 4 AWG is known to be 21.2 mm diameter.

First closed end lug 52 is connected to first multi conductor cable wire 56. One preferred body meant first multi conductor cable wire 56 is provided having a cable weight of 230 LBs/MFT.

First closed end lug 54 also has this cable wire but is split in two as demonstrated in FIG. 3 with each individual wire connected to a first blade fuse 58 and a second blade fuse 60. Each of the first blade fuse 58 and second blade fuse 60 in a preferred embodiment are 20-amp fuses. Cable wire exits each of the first blade fuse 58 and second blade fuse 60 and is connected to first hand lock connector 62 and second hand lock connector 64.

In a preferred environment, each a first hand lock connector 62 and second hand lock connector 64 are available commercially under the brand-name Posi-lock®.

Exiting each of first hand lock connector 62 and second hand lock connector 64 are first cable 68 and second cable

69. Each of these cables are constructed and arranged to be identical to first multi conductor cable wire 56.

As demonstrated in the FIG. 3, the four cables are encased in cover 70. Emanating outward from cover 70 are first exit cover 72 and second exit cover 78. As can be seen in FIG. 3, first outlet cover 72 has first multi conductor cable wire 56 contained therein and second exit cover 78 contains the combined are first cable 68 and second cable 69.

First multi conductor cable wire 56 is ultimately split into two separate wires and terminates in first terminating hand lock connector 74 and second terminating hand lock connector 76.

Extending from second exit cover 78 is first cable 68 and second cable 69 that ultimately terminate in third terminating hand lock connector 86 and fourth terminating hand lock connector 84 respectively as shown FIG. 3.

The system of the invention provides novel advancements over any currently known or used system in the following areas:
- A) Multiple fish finders and accessories can be provided sufficient, clean power on one wiring harness;
- B) Multiple speakers and amplifiers can be provided sufficient, clean power on one wiring harness;
- C) The hand lock or Posi-Lock® connectors allow for an easy, non-crimp application that erases the potential for voltage drop and corrosion;
- D) Every part of the harness is made with copper tinned coated wire and connectors to eliminate possibilities for corrosion in any outdoor or marine environment including salt water;
- E) First and only harness made to allow for a single pull application thru a vessel, atv, or vehicle to power marine electronics, electrical accessories, amplifiers and speakers;
- F) The harness is made with sufficient wire strands to carry power to marine electronics and accessories over a 26-foot run;
- G) Harness allows one to bypass bus bars while still being able to distribute adequate, clean power to multiple marine electronics and/or amplifiers and speakers;
- H) Harness increases battery life of cranking battery by preventing multiple electronics from draining cranking batteries down too far and causing failure in 6-8 months.

The following are illustrative as to method of use of the present invention

METHOD 1

Instructions for installation in a marine vessel
Step 1: Remove bow panel from boat.
Step 2: Remove panel from console
Step 3: Run electrical snake from bow of the vessel down the starboard gunnel to the transom of the vessel back by the batteries.
Step 4: Remove hand lock/posi-lock connectors and tape the 13 foot run that goes to the console to the 26 foot line that goes to the bow
Step 5: Tape the 26 foot line to the electrical tape ran to the back of the boat
Step 6: Pull the harness thru the boat till the long run reaches the bow of the boat
Step 7: Pull the 13 foot line out at the dash as much as possible to get that line into the console panel
Step 8: Pull the rest of the long run out at the bow
Step 9: Strip back power wire hot and ground wires
Step 9: Attach corrosion resistant in-line fuse holders to each hot side of power wires by unscrewing the end of the hand lock/posi-lock connector and inserting the hot wire(s) thru the end of the hand lock/posi-lock that screws off and into the middle portion of the hand lock/posi-lock and screwing it down
Step 10: Insert ground wire(s) in other hand lock/posi-lock by unscrewing the end of the hand lock/posi-lock connector and inserting the ground wire(s) thru the end of the hand lock/posi-lock that screws off and into the middle portion of the hand lock/posi-lock and screwing it down
Step 11: Unscrew the other end of the hand lock/posi-lock and reattach the posi-lock back the harness the same way as you connected the fuses and ground wires.
Step 12: Repeat step 10 and 11 for the power sources at the console
Step 13: Attached the eye-let with the two hots at the back of the harness to the back of the on/off switch
Step 14: Attach jumper to the opposite post on the back of the on/off switch with switch turned off
Step 14: Attach the other end of the jumper to the hot post on the cranking battery
Step 15: Attach the eye-let with the two grounds straight to the ground terminal on the cranking battery
Step 16: Turn switch on and power up power sources

METHOD 2

Step 1: Run harness as need from point of contact for amplifier and speakers to battery source
Step 2: Strip back power wires for amplifiers and speakers
Step 3: Attach hot(s) and ground(s) to hand lock/posi lock in the same manner as explained in steps 9-11 for the marine vessel application
Step 4: Insert ground wire(s) in other hand lock/posi-lock by unscrewing the end of the hand lock/posi-lock connector and inserting the ground wire(s) thru the end of the hand lock/posi-lock that screws off and into the middle portion of the hand lock/posi-lock and screwing it down
Step 5: Unscrew the other end of the hand lock/posi-lock and reattach the hand lock/posi-lock back the harness the same way as you connected the fuses and ground wires.
Step 6: Repeat step 4 and 5 for the power sources at the console
Step 7: Attached the eye-let with the two hots at the back of the harness to the back of the on/off switch
Step 8: Attach jumper to the opposite post on the back of the on/off switch with switch turned off
Step 9: Attach the other end of the jumper to the hot post on the cranking battery
Step 10: Attach the eye-let with the two grounds straight to the ground terminal on the cranking battery
Step 11: Turn switch on and power up power sources While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

What is claimed:
1. A system for power distribution, said system comprising:
 a first connection and a second connection each connected respectively to a first multi connector cable and a second multi connector cable;

said second multi connector cable being split into a set of two distinct wires connected to a circuit protector, wherein each of the first multi connector cable and the second multi connector cable are ultimately connected respectively to a third connection and a fourth connection configured to connect to a first load, and a fifth connection and a sixth connection configured to connect to a second load.

2. The system of claim 1, wherein the circuit protector connected to the two distinct wires of the second multi connector cable is a fuse.

3. The system of claim 1, wherein the second load generates electrical fluctuations on the second multi connector cable.

4. The system of claim 3, wherein the second load comprises at least one of a light, a pump, and a motor.

5. The system of claim 1, wherein the first load is a fish finder.

6. The system of claim 1, wherein the first multi connector cable is connected to at least one of:
   a switch,
   a filter, or
   a regulator.

7. The system of claim 6, wherein the at least one of the switch, the filter, or the regulator suppresses electrical fluctuations coupled from the second multi connector cable to the first multi connector cable.

8. The system of claim 1, wherein the first multi connector cable bypasses the circuit protector connected to the two distinct wires of the second multi connector cable.

9. A system for power distribution, said system comprising:
   a first connection and a second connection each connected respectively to a first multi connector cable and a second multi connector cable;
   said second multi connector cable being split into a set of two distinct wires connected to a circuit protector;
   wherein each of the first multi connector cable and the second multi connector cable are ultimately connected respectively to a third connection and a fourth connection, and a fifth connection and a sixth connection,
   wherein the third connection and the fourth connection are connected to a fish finder,
   wherein the fifth connection and the sixth connection are connected to loads which generate electrical fluctuations on the second multi connector cable, the loads comprising at least one of a light, a pump, or a motor,
   wherein the first multi connector cable is connected to at least one of a switch, a filter, or a regulator that suppress the electrical fluctuations coupled from the second multi connector cable to the first multi connector cable, and
   wherein the first multi connector cable bypasses the circuit protector connected to the two distinct wires of the second multi connector cable.

10. A system for power distribution, said system comprising:
    a first connection and a second connection each connected respectively to a first multi connector cable and a second multi connector cable;
    said second multi connector cable being split into a set of two distinct wires connected to a circuit protector;
    said set of two distinct wires connected each to a third connection and a fourth connection, respectively; and
    a second set of distinct wires each connected respectively to the third connection and the fourth connection respectively;
    wherein each of the first multi connector cable and the second multi connector cable are ultimately connected respectively to a fifth connection and a sixth connection configured to connect to a first load, and a seventh connection and an eighth connection configured to connect to a second load.

11. The system of claim 10, wherein the circuit protector connected to the two distinct wires of the second multi connector cable is a fuse.

12. The system of claim 10, wherein the second load generates electrical fluctuations on the second multi connector cable.

13. The system of claim 12, wherein the second load comprises at least one of a light, a pump, or a motor.

14. The system of claim 10, wherein the first load is a fish finder.

15. The system of claim 10, wherein the first multi connector cable further is connected to at least one of a switch, a filter, or a regulator.

16. The system of claim 15, wherein the at least one of the switch, the filter, or the regulator suppresses electrical fluctuations coupled from the second multi connector cable to the first multi connector cable.

17. The system of claim 10, wherein the first multi connector cable bypasses the circuit protector connected to the two distinct wires of the second multi connector cable.

* * * * *